(12) United States Patent
Agarwal et al.

(10) Patent No.: US 7,509,414 B2
(45) Date of Patent: Mar. 24, 2009

(54) SYSTEM AND METHOD FOR COLLECTION, AGGREGATION, AND COMPOSITION OF METRICS

(75) Inventors: Vikas Agarwal, New Delhi (IN); William P. Horn, Scarsdale, NY (US); Arun Kumar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 10/976,941

(22) Filed: Oct. 29, 2004

(65) Prior Publication Data

US 2006/0095562 A1 May 4, 2006

(51) Int. Cl.
*G06F 15/173* (2006.01)
(52) U.S. Cl. .................................. 709/224
(58) Field of Classification Search ............. 709/224
See application file for complete search history.

(56) References Cited

U.S. PATENT DOCUMENTS

| 6,405,251 | B1* | 6/2002 | Bullard et al. | 709/224 |
|---|---|---|---|---|
| 6,446,200 | B1* | 9/2002 | Ball et al. | 713/1 |
| 6,513,065 | B1 | 1/2003 | Hafez et al. | |
| 6,560,647 | B1* | 5/2003 | Hafez et al. | 709/224 |
| 6,721,405 | B1 | 4/2004 | Nolting et al. | |
| 2002/0099815 | A1* | 7/2002 | Chatterjee et al. | 709/224 |
| 2002/0123919 | A1 | 9/2002 | Brockman et al. | |
| 2002/0165892 | A1 | 11/2002 | Grumann et al. | |
| 2002/0174222 | A1* | 11/2002 | Cox | 709/224 |
| 2003/0084343 | A1* | 5/2003 | Ramachandran et al. | 713/201 |
| 2003/0126256 | A1 | 7/2003 | Cruickshank et al. | |
| 2003/0217079 | A1 | 11/2003 | Bakalash et al. | |
| 2004/0039809 | A1 | 2/2004 | Ranous et al. | |

OTHER PUBLICATIONS alphaWorks: Generic Log Adapter for Autonomic Computing http://web.archive.org/web/20031115064733/http://secure.alphaworks.ibm.com/tech/glaac. Aug. 1, 2003.*
alphaWorks: Generic Log Adapter for Autonomic Computing: Overview. Aug. 1, 2003. https://secure.alphaworks.ibm.com/tech/glaac (used to futher illustrate the Aug. 1, 2003 availbility date of the Generic Log Adapter).*
B. Topol et al. IBM Autonomic Computing. Automating problem determination: A first step toward self-healing computing systems. Oct. 2003.*

* cited by examiner

*Primary Examiner*—Andrew Caldwell
*Assistant Examiner*—John M MacIlwinen
(74) *Attorney, Agent, or Firm*—Gibb Intellectual Property Law Firm, LLC

(57) ABSTRACT

A method for collecting, aggregating, and composing metrics and a computer system comprises a producer application adapted to periodically generate metrics comprising state information of the producer application; a metric engine adapted to aggregate the metrics; and a consumer application adapted to receive the aggregated metrics, wherein the metric engine is further adapted to produce new metrics in accordance with desired requirements of the consumer application. The computer system further comprises a metric service policy adapted to provide definitions of the metrics generated from the producer application and desired requirements of the consumer application, wherein the metric service policy is adapted to establish an executable set of actions for producing the new metrics from the generated metrics, wherein the metric service policy is adapted to be executable by the metric engine, and wherein multiple metric service policies are simultaneously executable by the metric engine.

28 Claims, 3 Drawing Sheets

SYSTEM AND METHOD FOR COLLECTION, AGGREGATION, AND COMPOSITION OF METRICS

BACKGROUND OF THE INVENTION

1. Field of the Invention

The embodiments of the invention generally relate to computer architecture, and more particularly to computer architecture used for manipulating metrics.

2. Description of the Related Art

In the field of software development, metrics are measurements of a particular characteristic of the software program's performance, efficiency, or state. Various instrumented systems generate different kinds of logs. Each of these logs typically contains metrics that capture the state information of the associated system at various points in time. Such information has significant value from an information systems management point of view. For example, such information could be used to study system behavior, to detect performance bottlenecks, to prevent or recover from faults, for accounting, etc.

However, there is generally a gap between the information that a management application needs and the information which is available in a system log. Thus, it is often necessary to be able to collect and aggregate information from multiple logs available from multiple sources in order to serve the requirements of a management application; i.e., to generate the required information. The aggregation may involve deriving metrics after applying some process to the ones that are available from existing logs. Another related problem involves the format in which the management applications expect the desired information. For example, the format may be different from the format in which the available log was generated. Various instrumentation techniques exist which include technologies such as such as Unix Accounting Utilities (UAU), Application Response Measurement (ARM) Application Program Interface (API), Common Resource Modeling (CRM), z/OS (available from International Business Machines, Armonk, N.Y., USA), Common Information Model (CIM), Simple Network Management Protocol (SNMP) (available from Cisco Systems, Inc., San Jose, Calif., USA), Java® Management Extensions (JMX) (available from Sun Microsystems, Santa Clara, Calif., USA), etc. Apart from these, different software (including operating systems) have their own logging format. As such, it would be unreasonable to expect a generic management application to be able to recognize all such present and future log formats.

For example, the Web Services Level Agreement (WSLA) architecture available from International Business Machines, Armonk, N.Y., USA, is aimed at enabling and enforcing service level agreements for web services. A WSLA engine allows the provider and consumer of the service to specify the service level agreement (SLA) for their particular interaction and be able to monitor it for violations. The SLAs are described in terms of limits on various metrics that can be measured or derived from other metrics.

WSLAs are sufficient for the purposes they were designed for, but while a WSLA is aimed at solving the service level agreement problem for web services, it is not generically applicable to multiple metric producers/consumers and is tied to a set of fixed entities (that are involved in a service level agreement). Moreover, in a WSLA there is generally no distinction between metric definition and metric instances. Therefore, only one value of a metric can be represented at a point in time. This means that no context information can be associated with a metric.

Conventionally, customized software is developed every time there is a need to bridge this gap between the requirements of a management application and the outputs available from instrumented systems. Therefore, there is a need for an improved manner of bridging this gap to allow a generic management application to effectively recognize different log formats and to collect, aggregate, and compose metrics.

SUMMARY OF THE INVENTION

In view of the foregoing, an embodiment of the invention provides a method of interacting between a producer application and a consumer application in a computer system, wherein the method comprises the producer application periodically generating metrics comprising state information of the producer application; aggregating the metrics in a metric engine; and sending the aggregated metrics to the consumer application, wherein the aggregating process further comprises producing new metrics in accordance with desired requirements of the consumer application. The method further comprises establishing a metric service policy for providing definitions of the metrics generated from the producer application and desired requirements of the consumer application. Moreover, the metric service policy establishes an executable set of actions for producing the new metrics from the generated metrics, wherein the metric service policy is executable by the metric engine, and wherein multiple metric service policies are simultaneously executable by the metric engine. The method further comprises creating an extensible markup language (XML) representation of the aggregated metrics, wherein the aggregated metrics comprise value and context information of each metric in the aggregated metrics.

Another aspect of the invention provides a program storage device readable by computer, tangibly embodying a program of instructions executable by the computer to perform a method of interacting between a producer application and a consumer application in a computer system, wherein the method comprises the producer application periodically generating metrics comprising state information of the producer application; aggregating the metrics in a metric engine; and sending the aggregated metrics to the consumer application.

Another embodiment of the invention provides a computer system comprising a producer application adapted to periodically generate metrics comprising state information of the producer application; a metric engine adapted to aggregate the metrics; and a consumer application adapted to receive the aggregated metrics, wherein the metric engine is further adapted to produce new metrics in accordance with desired requirements of the consumer application. The computer system further comprises a metric service policy adapted to provide definitions of the metrics generated from the producer application and desired requirements of the consumer application, wherein the metric service policy is adapted to establish an executable set of actions for producing the new metrics from the generated metrics, wherein the metric service policy is adapted to be executable by the metric engine, and wherein multiple metric service policies are simultaneously executable by the metric engine.

Additionally, the computer system comprises a metric record parser adapted to receive and extract input metric records from the producer application. Also, the computer system comprises a metric service policy parser adapted to parse the metric service policy. Furthermore, the computer system comprises an event handler adapted to extract schedules and triggers from the metric service policy and to generate appropriate events to be supplied to a composition engine. The composition engine is adapted to collect the input metric records and to generate aggregated metrics based on the input metric records. The computer system further comprises a database adapted to store the input metric records and to store the aggregated metrics at multiple stages of execution of the metric service policy.

Moreover, the computer system comprises a metric record generator adapted to receive the aggregated metrics, assemble the aggregated metrics into a desired metric record, and to send the aggregated metrics to the consumer application. The computer system also comprises a subscription service system adapted to allow the consumer application to subscribe to the desired metric record and a query system adapted to allow queries to be performed of the input metric records and the aggregated metrics stored in the database. Additionally, the metric record generator is adapted to create an XML representation of the aggregated metrics, wherein the aggregated metrics comprise value and context information of each metric in the aggregated metrics.

The metric service provided by the embodiments of the invention could be offered as a service or it could be embedded as an engine inside other systems such as grid middleware, web services middleware, application servers, and custom software for applications such as intrusion detection, fault monitoring, metering and accounting, etc. The metric service provided by the embodiments of the invention is generically applicable to multiple metric producers/consumers and is not tied to a set of fixed entities. Moreover, the embodiments of the invention deal with metrics in conjunction with their associated context information, in the form of records. This enables the metric service provided by the embodiments of the invention to handle multiple entities (i.e. producers, consumers, etc.) and multiple policies simultaneously, making it applicable to a variety of other management applications in additions to SLAs. Furthermore, both synchronous and asynchronous metrics are supported in the metric service provided by the embodiments of the invention. As such, the metric service provided by the embodiments of the invention provides a single point of access for metric producers as well as metric consumers, thus shielding them from the details of the destination/source of the metrics involved. Additionally, apart from source/destination details, the embodiments of the invention bridge the gap between the requirement schedules specified by the consumers and the variation and differences in availability schedules of the component raw metrics.

Also, the embodiments of the invention include a state-machine and accumulator in order to specify event correlation required for certain cases of metric composition. Moreover, the embodiments of the invention handle the distributed nature of its consumers and producers quite effectively. Metrics can be obtained/received from any number of different machines and the consumers may also reside anywhere. Furthermore, the embodiments of the invention provide a generic engine, thereby obviating the need for an expensive custom solution, especially when the same functionality is required by different applications in different domains.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

Figure 1:
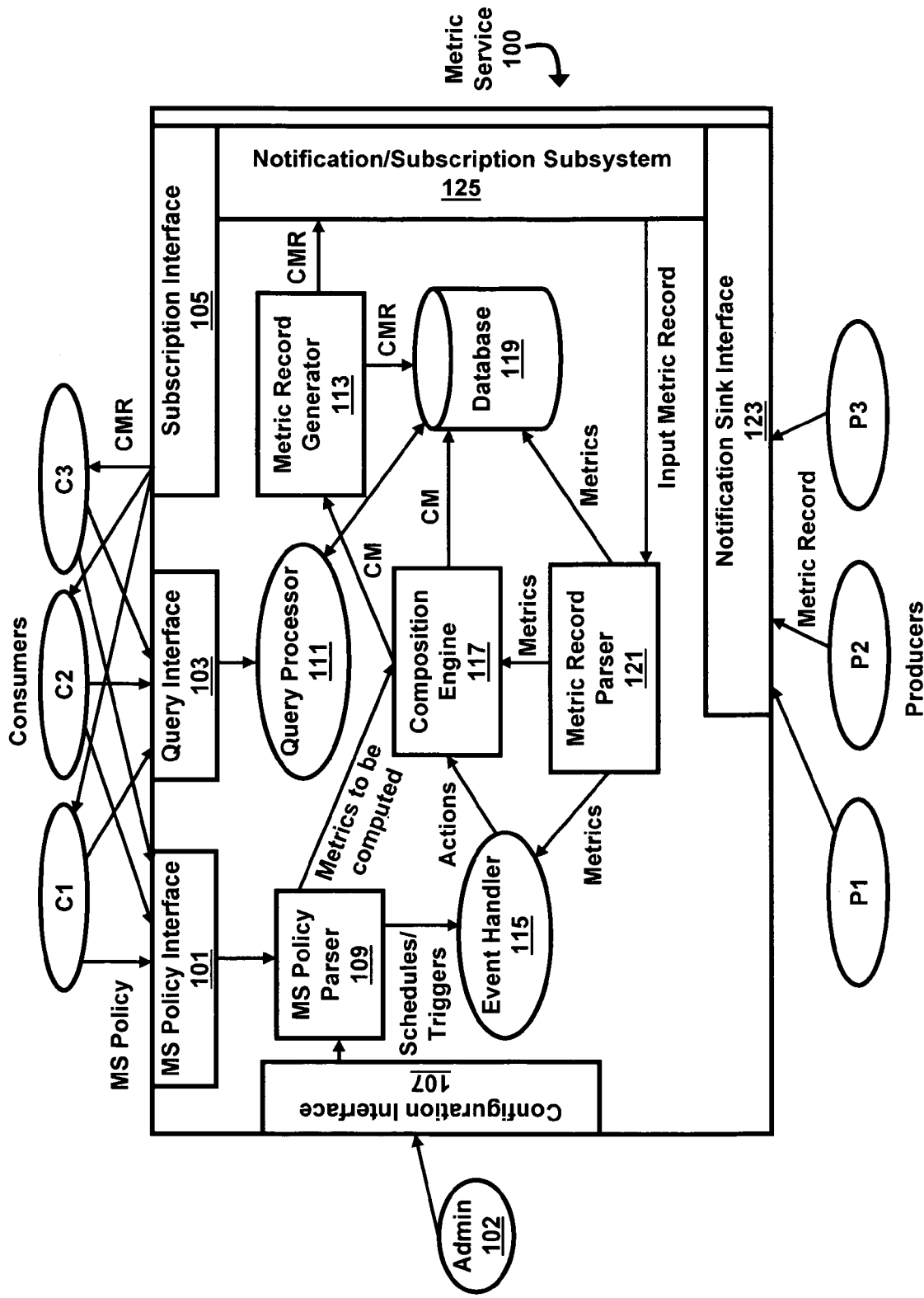
FIG. 1 is a schematic diagram of a metric service system according to an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned there is a need for an improved generic management application that effectively recognizes different log formats and collects, aggregates, and composes metrics. The embodiments of the invention address this need by providing a technique for decoupling the interaction between the producers and consumers of the management information and using middleware to handle the recognition of the different formats and aggregation mechanisms. In particular, the embodiments of the invention distinguishes between metric definition and metric instances, and uses the notion of a metric record to associate context information with the metrics, wherein a metric instance could be used in multiple policies.

Referring now to the drawings and more particularly to FIGS. 1 through 4 where similar reference characters denote corresponding features consistently throughout the figures, there are shown preferred embodiments of the invention. The embodiments of the invention provide a metric service 100, which may be embodied as a generic engine that accepts metrics, manipulates them, and generates new metrics. The generic metric service engine 100 provided by the embodiments of the invention collects raw metrics from various producers P1, P2, P3 and processes them to compute metrics desired by various consumers C1, C2, C3. The metric records generated by different producers vary in their content because producers are instrumented with different technologies such as JMX, CIM, and ARM, etc. Similarly, metrics may get produced asynchronously or at fixed schedules depending upon the application logic of the particular producer (i.e., P1, P2, or P3). The consumers C1, C2, C3 of such metrics are typically management applications such as intrusion detection, metering and accounting, SLA management, etc. Moreover, the consumers C1, C2, C3 require specific sets of these or derived metrics either synchronously or asynchronously.

As such, the metric service 100 is embodied as middleware that executes the metric service policy (MS-Policy). The MS-Policy specifies (1) the format and content of input metric records available from various instrumented systems; (2) the schedule as per which those metric records become available; (3) the format and content of the metric records required by the management applications; (4) the schedule based upon which the desired metrics have to be supplied; and (5) the process which derives the final metrics from the metrics available from instrumented systems. The MS-Policy specifies the above using an XML based MS-Policy language specification. Some examples of management applications where a metric service could be of significant use are metering and accounting of grid services and/or web services.

FIG. 1 illustrates the runtime execution environment provided by an embodiment of the invention. Producers P1, P2, P3 are applications or systems that generate metrics in some particular format. These systems either generate these metrics on their own or through the help of an instrumentation technology such as JMX, CIM, ARM, etc. Some producers P1, P2, P3 can propagate the generated metrics to interested parties (registered with them) while others just log them on their local disk. The content and format of these log records are specific to those applications and/or the instrumentation technology used. The frequency with which these records are generated is also specific to the particular producer application P1, P2, P3.

Consumers C1, C2, C3 are those applications that require values of certain metrics in order to carry out their function. The consumers C1, C2, C3 may require these metrics on the occurrence of an event or periodically. Examples of such applications include management applications such as monitoring, SLA management, fault detection and error recovery modules, intrusion detection systems, metering, capacity planning, and load balancing, etc. The type of applications or systems that these management applications manage may vary significantly. Each of those managed application is a producer of metrics and has its own specific format, as well as its own schedule of producing those metrics. Management applications may need to monitor metrics from various such producers P1, P2, P3. Moreover, management applications may need to correlate and aggregate metrics from different producers P1, P2, P3 in order to obtain desired information.

As mentioned, the metric service 100 is preferably embodied as a generic engine that accepts metrics, manipulates them, and generates new metrics. It collects raw metrics from various producers P1, P2, P3 and processes them to compute metrics desired by various consumers C1, C2, C3. FIG. 1 shows a metric service that obtains metrics from various producers such as UAU, API ARM, CRM, CIM, SNMP, JMX, etc. The metric service 100 provides an interface through which the metrics can either be pulled synchronously by the metric service 100 or pushed asynchronously by the producers P1, P2, P3. These metrics are then logged along with their context information and composite metrics are computed from them. Another interface 105 of the metric service 100 allows these derived metrics to be pushed asynchronously to interested consumers C1, C2, C3, or the consumers C1, C2, C3 could pull them in a synchronous mode.

Figure 2:
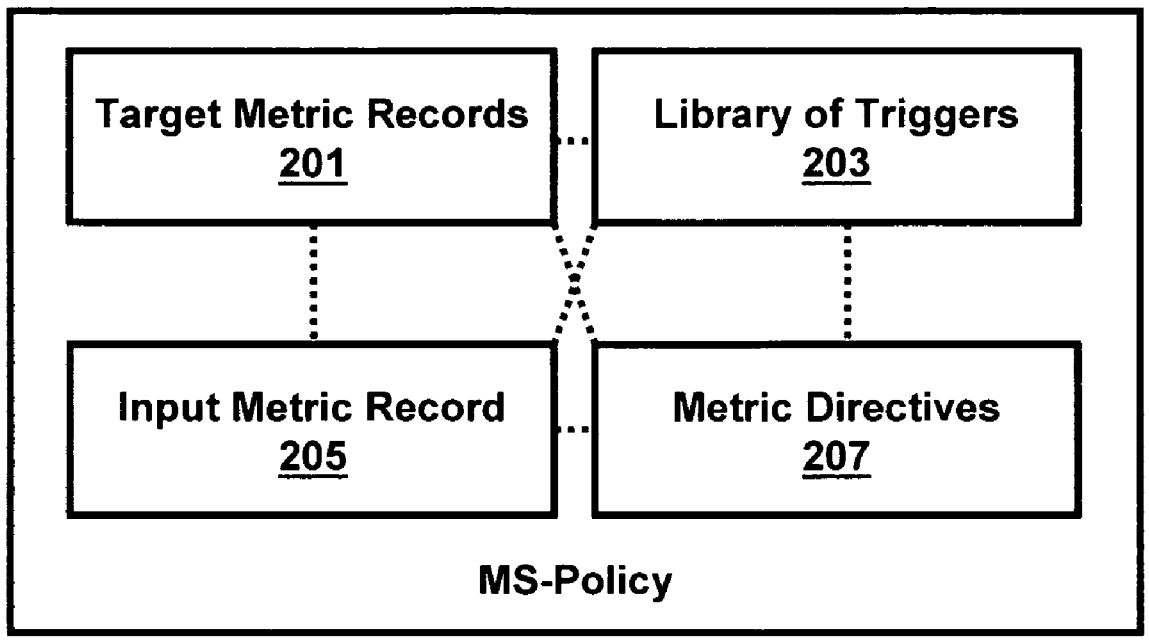
FIG. 2 is a schematic diagram of the MS-Policy parser of FIG. 1 according to an embodiment of the invention.

The metric record parser 121 receives the input metric records from the notification subsystem 125, parses them, and extracts the metrics out. These are then represented in a metric service local data-structure 119 such as a hashtable or a database. The MS-Policy parser 109 parses the policy supplied to it from the consumers C1, C2, C3 through a MS-Policy interface 101 or from the administrator through the configuration interface 107. The MS-Policy includes four main components, which as shown in FIG. 2, comprises target metric records 201 that specify one or more composite metric records (CMR) that are desired by consumers C1, C2, C3. The metrics in these records could be obtained directly from multiple input metric records collected from different producers P1, P2, P3. Alternatively, the target metrics may get derived from different metrics in the input metric records. A library of triggers 203 is used to specify a schedule or an event on the occurrence of which an action needs to be taken. This library 203 in the policy is used to define various named triggers that could be referred to elsewhere in the policy. The input metric record 205 is that component of the policy which defines the metric records needed by various elements of the policy. One or more metric directives 207 specify how the target metrics are obtained from the available input metrics. For target metrics that are not directly obtainable from the input metrics, the metric directive defines the process through which they can be derived.

The administrator 102 interacts with the metric service 100 through the configuration interface 107. The administrator 102 uses the configuration interface 107 to supply metric record definitions and new metric service policies to be loaded into the metric service 100 for execution. The MS-Policy provided by the embodiments of the invention provides definitions of "raw" metrics produced and "derived" metrics desired by the consumers along with a set of actions that have to be executed in order to obtain derived metrics from those raw metrics. In other words, the definition of metric records (whether input metric records or target metric records) are supplied to the metric service by an administrator 102 through the configuration interface 107. These metric records are referred to in an MS-Policy written using an MS-Policy language specification. An MS-Policy includes the derivation process and can be supplied either by the administrator 102 (through the configuration interface 107) or by the consumers C1, C2, C3 (through the MS-Policy interface 101) directly. However, since the MS-Policy supplied by the consumers C1, C2, C3 cannot necessarily be trusted, in practice, the MS-Policy would almost always be supplied by the administrator 102. The MS-Policy enables automation of the process of deriving composite metrics and at the same time shields the consumers C1, C2, C3 and producers P1, P2, P3 from diversity in metric sources and metric sinks respectively. Producers P1, P2, P3 and consumers C1, C2, C3 are also saved from having to adjust themselves to the requirement/generation schedules of those metrics.

Again, with reference to FIG. 1, based upon the metric directives in the policy received, the MS-Policy parser 109 creates events or schedules to enable the collection of input metrics and generation of computed metrics. The scheduler and event handler components 115 deal with such events. The MS-Policy parser 109 extracts the schedule/trigger elements of the MS-Policy supplied to it and passes them onto the event handler 115. The event handler 115 uses the schedule elements to generate events at the time intervals specified in the schedule(s). The event handler 115 uses the trigger elements along with values of incoming input metrics to generate appropriate events when the condition specified in the triggers become true. These generated events are then passed onto the composition engine 117 which fires off actions associated with those events. For example, a schedule may specify that "every five seconds an input metric record A has to be pulled from producer P1". This schedule makes the event handler 115 generate an event every five seconds and pass it to the composition engine 117 which fires the action to pull the metric record from its source. The composition engine 117 is responsible for executing the MS-policy. The composition engine 117 obtains the input metrics as per the measurement directives in the MS-policy. Metrics are either obtained when triggered by the event handler 115 or when they arrive asynchronously. Next, the composition engine 117 applies relevant functions on those metrics in order to create the desired composite metrics.

The metric record generator 113 receives computed composite metrics (CM) from the composition engine 117, assembles them into the desired composite metric record (CMR), and dispatches it to a database 119 and a notification/subscription subsystem 125. Each metric is generally a part of a metric record. Thus, when a composite metric is generated, its value and context information is collected along with all other metrics belonging to that metric record. These metric instances are then used to create the XML representation of that composite metric record instance. This XML representation of a composite metric record is then sent (through the subscription interface 105) to all the consumers (i.e., C1, C2, and/or C3) that have subscribed to receive it. The database 119 stores the incoming metric records and provides persistence facility to store metrics at various stages of the policy execution. The notification/subscription subsystem 125 provides a notification source as well as a notification sink interface 123. In this context, "source" refers to the source of the target metric records and "sink" refers to the module that consumes the input metric records as they arrive from the producers P1, P2, P3. This allows the consumers C1, C2, C3 to subscribe to the metric records of interest and the producers P1, P2, P3 to supply the input metrics. The query processor 111 allows querying of various metrics (input metrics as well as those that are composed by the composition engine 117) stored in the database 119 and communicates with the consumers C1, C2, C3 through a query interface 103.

Figure 3:
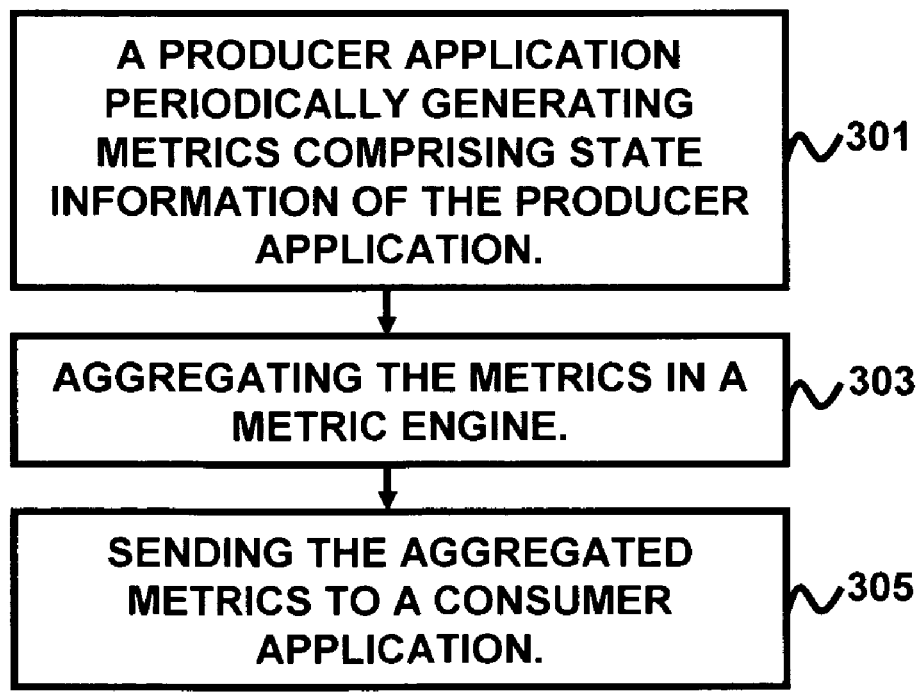
FIG. 3 is a flow diagram illustrating a preferred method according to an embodiment of the invention.

FIG. 3, which refer to components described in FIGS. 1 and 2, illustrates a flowchart of a method of interacting between a producer application and a consumer application in a computer system, wherein the method comprises the producer application periodically generating (301) metrics comprising state information of the producer application P1, P2, P3; aggregating (303) the metrics in a metric engine 100; and sending (305) the aggregated metrics to the consumer application C1, C2, C3, wherein the aggregating process (303) further comprises producing new metrics in accordance with desired requirements of the consumer application C1, C2, C3.

The method further comprises establishing a metric service policy for providing definitions of the metrics generated from the producer application P1, P2, P3 and desired requirements of the consumer application C1, C2, C3. Moreover, the metric service policy establishes an executable set of actions for producing the new metrics from the generated metrics, wherein the metric service policy is executable by the metric engine 100, and wherein multiple metric service policies are simultaneously executable by the metric engine 100. In other words, a metric service policy may be instantiated for different producer/consumer pairs simultaneously and also multiple metric service policies each describing a different derivation process may also be instantiated simultaneously. The method further comprises creating an XML representation of the aggregated metrics, wherein the aggregated metrics comprise value and context information of each metric in the aggregated metrics.

Figure 4:
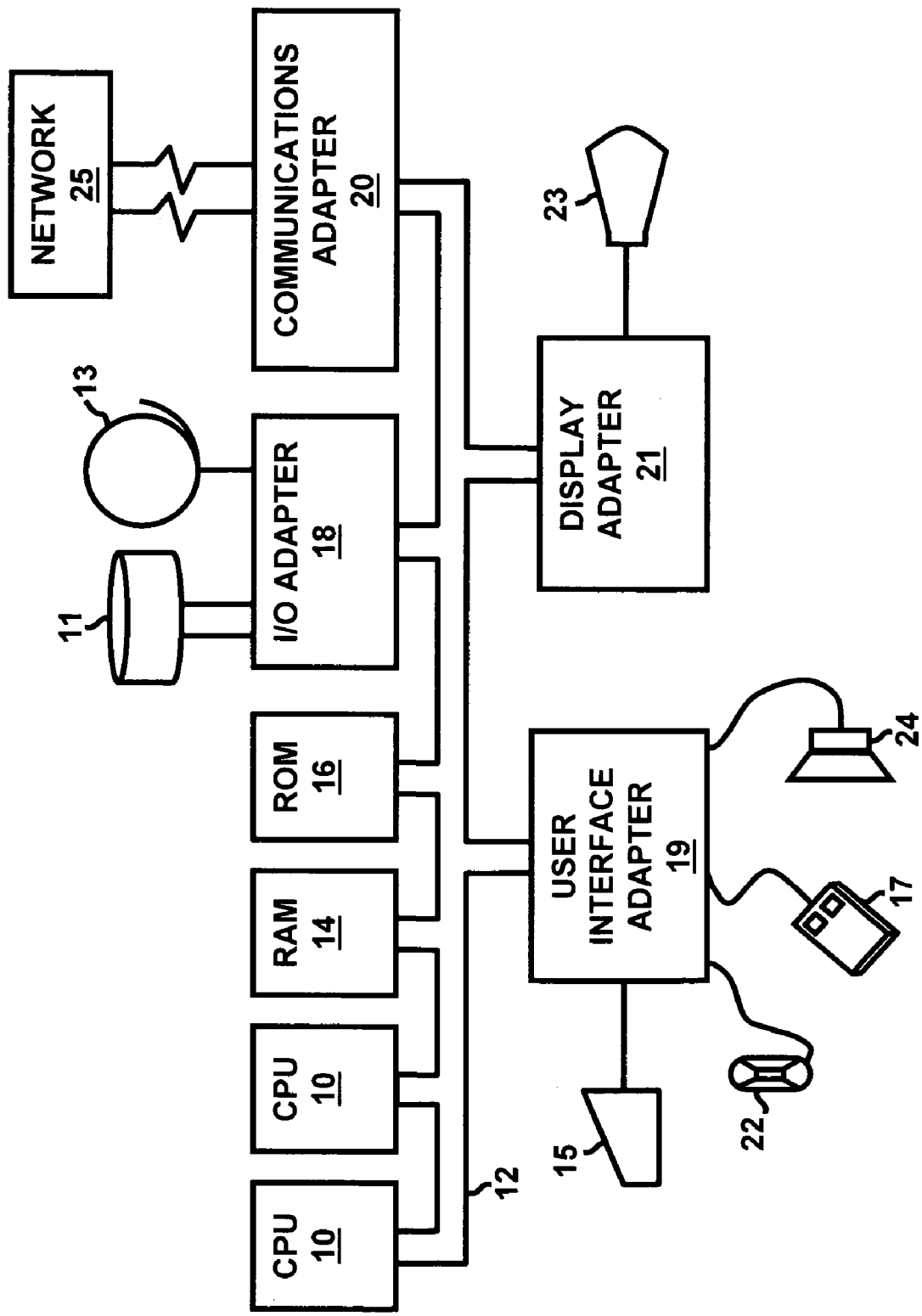
FIG. 4 is a computer system diagram according to an embodiment of the invention.

A representative hardware environment for practicing the embodiments of the invention is depicted in FIG. 4. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Generally, the embodiments of the invention provide a computer system comprising a producer application P1, P2, P3 adapted to periodically generate metrics comprising performance information of the producer application P1, P2, P3; a metric engine 100 adapted to aggregate the metrics; and a consumer application C1, C2, C3 adapted to receive the aggregated metrics, wherein the metric engine 100 is further adapted to produce new metrics in accordance with desired requirements of the consumer application C1, C2, C3. The computer system further comprises a metric service policy adapted to provide definitions of the metrics generated from the producer application P1, P2, P3 and desired requirements of the consumer application C1, C2, C3, wherein the metric service policy is adapted to establish an executable set of actions for producing the new metrics from the generated metrics, wherein the metric service policy is adapted to be executable by the metric engine 100, and wherein multiple metric service policies are simultaneously executable by the metric engine 100.

The metric service 100 could be offered as a service or it could be embedded as an engine (i.e., metric engine 100) inside other systems such as grid middleware, web services middleware, application servers, and custom software for applications such as intrusion detection, fault monitoring, metering and accounting, etc. The metric engine 100 is generically applicable to multiple metric producers/consumers and is not tied to a set of fixed entities. Moreover, the embodiments of the invention deal with metrics in conjunction with their associated context information, in the form of records. This enables the metric engine 100 to handle multiple entities (i.e. producers P1, P2, P3, consumers C1, C2, C3, etc.) and multiple policies simultaneously, making it applicable to a variety of other management applications in additions to SLAs. Furthermore, both synchronous and asynchronous metrics are supported in the metric engine 100. As such, the metric engine 100 provides a single point of access for metric producers P1, P2, P3 as well as metric consumers C1, C2, C3, thus shielding them from the details of the destination/source of the metrics involved. Additionally, apart from source/destination details, the embodiments of the invention bridge the gap between the requirement schedules specified by the consumers and the variation and differences in availability schedules of the component raw metrics.

Also, the embodiments of the invention include a state-machine and accumulator in order to specify event correlation required for certain cases of metric composition. Moreover, the embodiments of the invention handle the distributed nature of its consumers C1, C2, C3 and producers P1, P2, P3 quite effectively. Metrics can be obtained/received from any number of different computer systems and the consumers may also reside anywhere. Furthermore, the embodiments of the invention provide a generic metric engine 100, thereby obviating the need for an expensive custom solution, especially when the same functionality is required by different applications in different domains.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

What is claimed is:

1. A method for providing a metric service that collects, aggregates, and composes metrics, said method comprising:
    declaratively specifying a metric service policy (MS-Policy), said MS-policy comprising:
        a format and a content of input metric records inputted by a plurality of producer applications,
            wherein said format and said content vary among said plurality of producer applications, and
            wherein said input metric records comprise state information of said plurality of producer applications;
        a schedule of availability for said input metric records;
        a format and a content of metric records required by a generic management application;
        a schedule based on which desired metrics must be supplied; and
        a process, executed by a generic engine of said generic management application, that derives final metrics from said input metric records;
        wherein said declaratively specifying said MS-policy uses an XML based, MS-policy language specification;
    collecting, by a metric service engine, said input metric records according to said MS-policy from different producer applications;
    parsing, by a metric record parser of said metric service engine, said MS-policy for which said desired metrics needed by various elements of said consumer application are defined;
    aggregating, by said metric service engine said collected input metric records;
    composing, by a composition engine of said metric service engine, composite metrics from said input metric records, according to said MS-Policy, said composite metrics being assembled into desired composite metric records; and
    sending an XML representation of said desired composite metric records via a subscription interface to a plurality of consumer applications.

2. The method according to claim 1, wherein said metric service policy further comprises:
    target metric records that specify one or more composite metric records that are desired by a plurality of consumer applications;
    a library of triggers used to specify a schedule or an event on the occurrence of which an action needs to be taken;
    an input metric record that defines the metric records needed by various elements of said metric service policy; and
    at least one metric directive specifying how target metrics are obtained from available input metrics.

3. The method according to claim 1, wherein said metric service policy establishes an executable set of actions for producing composite metrics from said target metric records.

4. The method according to claim 1, wherein said metric service policy is executable by said metric service engine.

5. The method according to claim 1, wherein multiple metric service policies are simultaneously executable by said metric service engine.

6. The method according to claim 1, further comprising creating an extensible markup language (XML) representation of said aggregated metrics, wherein said aggregated metrics comprise value and context information of each metric in said aggregated software metrics.

7. The method according to claim 1, further comprising subscribing a plurality of consumer applications to a subscription service for said desired composite metric records.

8. A program storage device readable by computer, comprising a program of instructions executable by said computer to perform a method for providing a metric service that collects, aggregates, and composes metrics, said method comprising:
    declaratively specifying a metric service policy (MS-Policy), said MS-policy comprising:
        a format and a content of input metric records inputted by a plurality of producer applications,
            wherein said format and said content vary among said plurality of producer applications, and
            wherein said input metric records comprise state information of said plurality of producer applications;
        a schedule of availability for said input metric records;
        a format and a content of metric records required by a generic management application;
        a schedule based on which desired metrics must be supplied; and
        a process, executed by a generic engine of said generic management application, that derives final metrics from said input metric records;
        wherein said declaratively specifying said MS-policy uses an XML based, MS-policy language specification;
    collecting, by a metric service engine, said input metric records according to said MS-policy from different producer applications;
    parsing, by a metric record parser of said metric service engine, said MS-policy for which said desired metrics needed by various elements of said consumer application are defined;
    aggregating, by said metric service engine said collected input metric records;
    composing, by a composition engine of said metric service engine, composite metrics from said input metric records, according to said MS-Policy, said composite metrics being assembled into desired composite metric records; and
    sending an XML representation of said desired composite metric records via a subscription interface to a plurality of consumer applications.

9. The program storage device according to claim 8, wherein said metric service policy further comprises:

target metric records that specify one or more composite metric records that are desired by a plurality of consumer applications;

a library of triggers used to specify a schedule or an event on the occurrence of which an action needs to be taken;

an input metric record that defines the metric records needed by various elements of said metric service policy; and at least one metric directive specifying how target metrics are obtained from available input metrics.

10. The program storage device according to claim 8, wherein said metric service policy establishes an executable set of actions for producing composite metrics from said target metric records.

11. The program storage device according to claim 8, wherein said metric service policy is executable by said metric service engine.

12. The program storage device according to claim 8, wherein multiple metric service policies are simultaneously executable by said metric service engine.

13. The program storage device according to claim 8, wherein said method further comprises creating an extensible markup language (XML) representation of said aggregated metrics, wherein said aggregated metrics comprise value and context information of each metric in said aggregated metrics.

14. The program storage device according to claim 8, further comprising subscribing a plurality of consumer applications to a subscription service for said desired composite metric records.

15. A computer system for providing a metric service that collects, aggregates, and composes metrics, said computer system comprising:

at least one processor or central processing unit (CPU);

a metric service engine that:

receives a declaratively specified metric service policy (MS-Policy), said MS-policy comprising:

a format and a content of input metric records inputted by a plurality of producer applications, wherein said format and said content vary among said plurality of producer applications, and wherein said input metric records comprise state information of said plurality of producer applications;

a schedule of availability for said input metric records;

a format and a content of metric records required by a generic management application;

a schedule based on when desired metrics must be supplied; and a process, executed by a generic engine of said generic management application, that derives final metrics from said input metric records;

wherein said declaratively specifying said MS-policy uses an XML based, MS-policy language specification;

collects said input metric records according to said MS-Policy from different producer applications; and aggregates said collected input metric records; and said metric service engine comprising:

a metric record parser that parses said MS-policy for which said desired metrics needed by various elements of said consumer application are defined;

a composition engine that composes composite metrics from said input metric records, according to said MS-policy, said composite metrics being assembled into desired composite metric records; and a notification/subscription subsystem that sends an XML representation of said desired composite metric records to a plurality of consumers.

16. The computer system according to claim 15, wherein said metric service policy comprises: target metric records that specify one or more composite metric records that are desired by a plurality of consumer applications; a library of triggers used to specify a schedule or an event on the occurrence of which an action needs to be taken; an input metric record that defines the metric records needed by various elements of said metric service policy; and at least one metric directive specifying how target metrics are obtained from available input metrics.

17. The computer system according to claim 16, wherein said metric service policy parser is configured to parse said metric service policy.

18. The computer system according to claim 16, said metric service engine further comprising an event handler configured to extract schedules and triggers from said metric service policy and to generate appropriate events to be supplied to said composition engine.

19. The computer system according to claim 15, wherein said metric service policy is configured to establish an executable set of actions for producing composite metrics from said target metric records.

20. The computer system according to claim 15, wherein said metric service policy is configured to be executable by said metric service engine.

21. The computer system according to claim 15, wherein multiple metric service policies are simultaneously executable by said metric service engine.

22. The computer system of claim 15, wherein said metric record parser is configured to receive and extract input metric records from a plurality of producer applications.

23. The computer system according to claim 22, wherein said composition engine is configured to collect said input metric records and to generate aggregated software metrics based on said input metric records.

24. The computer system according to claim 23, further comprising a database configured to store said input metric records and to store said aggregated metrics at multiple stages of execution of said metric service policy.

25. The computer system according to claim 24, said metric service engine further comprising a query interface configured to allow queries to be performed of said input metric records and said aggregated metrics stored in said database.

26. The computer system according to claim 23, said metric service engine further comprising a metric record generator configured to receive said aggregated metrics, assemble said aggregated metrics into said desired composite metric record, and to send said aggregated metrics to a plurality of consumer applications.

27. The computer system according to claim 23, said metric service engine further comprising a notification/subscription subsystem to allow a plurality of consumer applications to subscribe to said desired composite metric records.

28. The computer system according to claim 15, said metric service engine further comprising a metric record generator configured to create an extensible markup language (XML) representation of said aggregated metrics, wherein said aggregated metrics comprise value and context information of each metric in said aggregated metrics.

* * * * *